(12) United States Patent
Ripoll et al.

(10) Patent No.: US 7,901,086 B2
(45) Date of Patent: Mar. 8, 2011

(54) OPTICAL UNIT, LIGHT PROCESSING UNIT, LIGHT PROCESSING METHOD, ILLUMINATION UNIT AND IMAGE GENERATION UNIT

(75) Inventors: Olivier Ripoll, Esslingen (DE); Markus Kamm, Karlsruhe (DE)

(73) Assignee: SONY Deutschland GmbH, Berlin (DE)

( * ) Notice: Subject to any disclaimer, the term of this patent is extended or adjusted under 35 U.S.C. 154(b) by 963 days.

(21) Appl. No.: 11/684,807

(22) Filed: Mar. 12, 2007

(65) Prior Publication Data

US 2007/0230179 A1 Oct. 4, 2007

(30) Foreign Application Priority Data

Mar. 29, 2006 (EP) .................................. 06006609

(51) Int. Cl.
*G03B 21/14* (2006.01)
(52) U.S. Cl. ................. 353/84; 353/30; 353/31; 353/33; 353/38; 353/81; 353/119; 353/122; 348/268; 348/270; 348/742; 348/744; 348/771; 359/15; 359/22; 359/227; 359/237; 359/196.1; 359/197.1; 359/198.1; 362/227; 362/231; 362/551; 362/553; 362/555
(58) Field of Classification Search ................. 353/7, 8, 353/10, 84, 30, 31, 33, 38, 81, 119, 122; 359/9, 15, 22, 227, 230, 237, 196.1, 197.1, 359/198.1, 889, 890, 891, 892, 201.2, 207.8; 348/268, 270, 743, 271, 742, 744, 771; 362/227, 362/231, 551, 553, 555, 561
See application file for complete search history.

(56) References Cited

U.S. PATENT DOCUMENTS

| | | | |
|---|---|---|---|
| 3,606,515 A | 9/1971 | Hirsch et al. | |
| 3,619,022 A | 11/1971 | Hirsch et al. | |
| 3,685,900 A | 8/1972 | Kirby et al. | |
| 4,277,138 A | 7/1981 | Dammann | |
| 5,371,543 A * | 12/1994 | Anderson | 348/270 |
| 5,868,482 A * | 2/1999 | Edlinger et al. | 353/84 |
| 6,726,333 B2 * | 4/2004 | Huibers et al. | 353/84 |
| 6,808,270 B2 * | 10/2004 | Nelson et al. | 353/69 |
| 6,876,505 B2 * | 4/2005 | Niwa | 359/891 |
| 6,999,252 B2 * | 2/2006 | Lee et al. | 359/892 |
| 7,040,766 B2 * | 5/2006 | Hibi et al. | 353/99 |
| 2001/0008470 A1 | 7/2001 | Dewald | |
| 2002/0054031 A1 | 5/2002 | Elliott et al. | |

(Continued)

OTHER PUBLICATIONS

Jahja I. Trisnadi, "Speckle contrast reduction in laser projection displays", Proceedings of SPIE, vol. 4657, XP-002329078, 2002, pp. 131-137.

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

For displaying a color image by recombination of several single color images, parasitic noise like speckles due to scattering within the system, in particular when laser light is involved, with the invention a significant improvement with a low number of parts can be realized by use of a color wheel that comprises in radially divided zones refractive elements for redirecting light beams incoming at different impinging angles and redistributing elements, e.g. a hologram, that provide for a defined output beam in an optical axis. The sequence of the individual light processing zones on the color wheel are synchronized with respective laser sources. The invention combines the functionality of plural elements, reduces speckles and avoids losses.

54 Claims, 18 Drawing Sheets

U.S. PATENT DOCUMENTS

| | | |
|---|---|---|
| 2002/0075460 A1 | 6/2002 | Kappel et al. |
| 2003/0048423 A1* | 3/2003 | Aastuen et al. ............... 353/31 |
| 2004/0008392 A1 | 1/2004 | Kappel et al. |
| 2004/0130684 A1* | 7/2004 | Kim et al. ..................... 353/84 |
| 2005/0286101 A1* | 12/2005 | Garner et al. .................. 359/9 |
| 2006/0002109 A1* | 1/2006 | Imade ........................ 362/231 |
| 2007/0279534 A1* | 12/2007 | Doser ......................... 348/743 |

\* cited by examiner

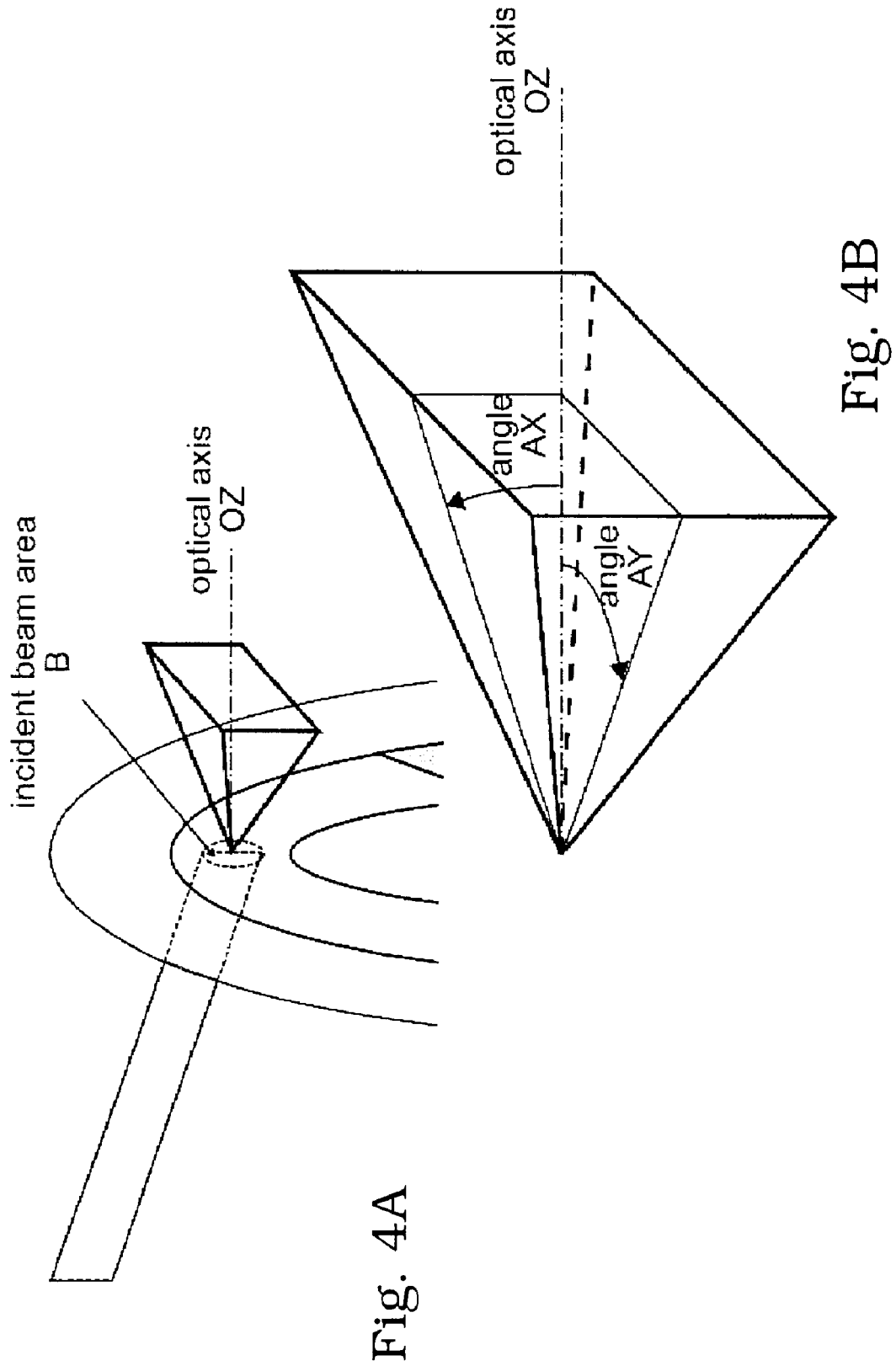

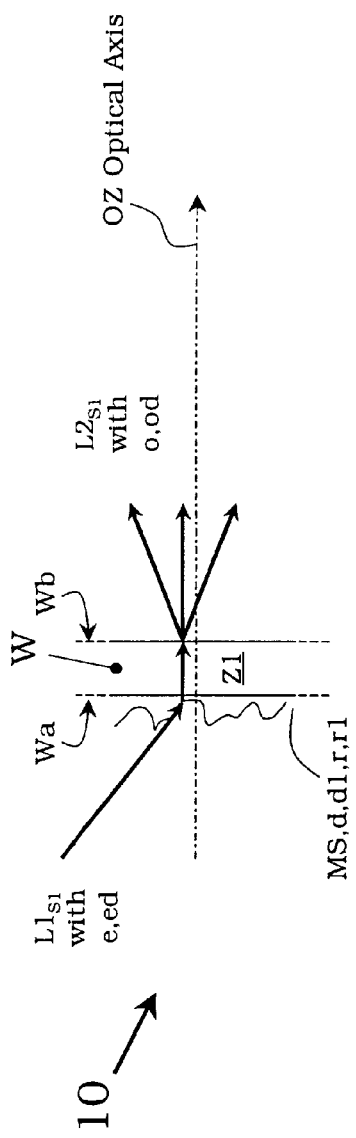
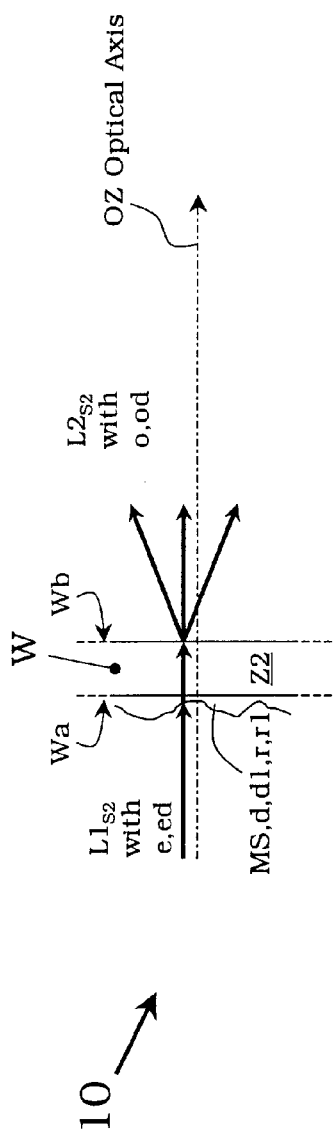
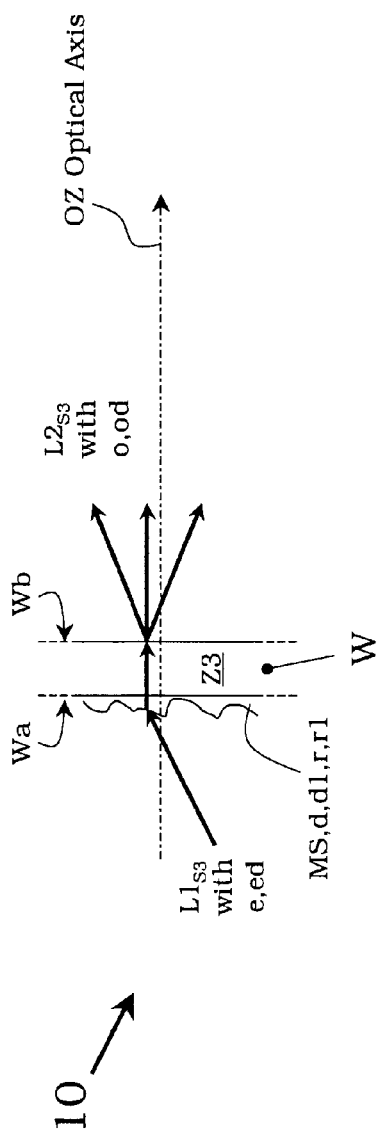

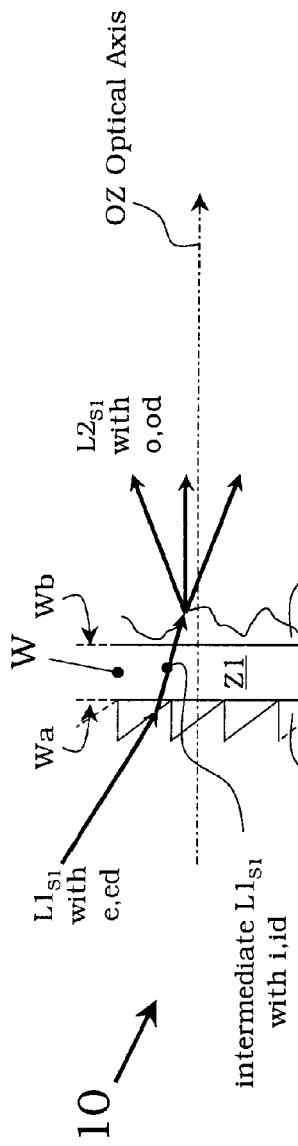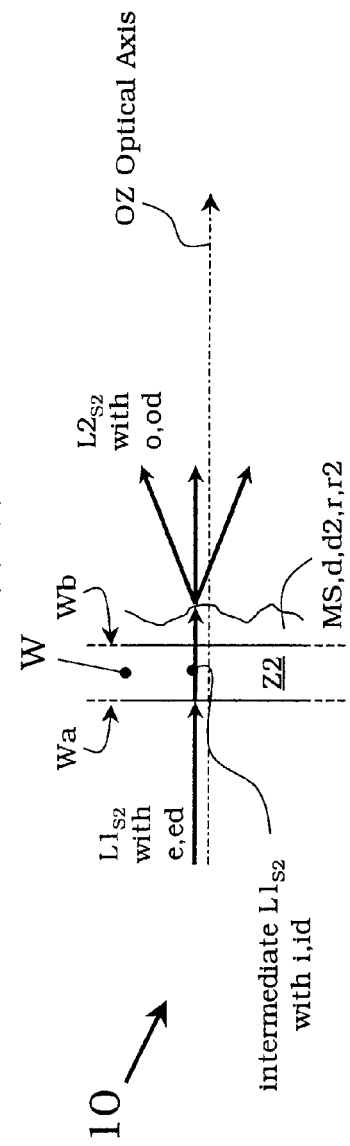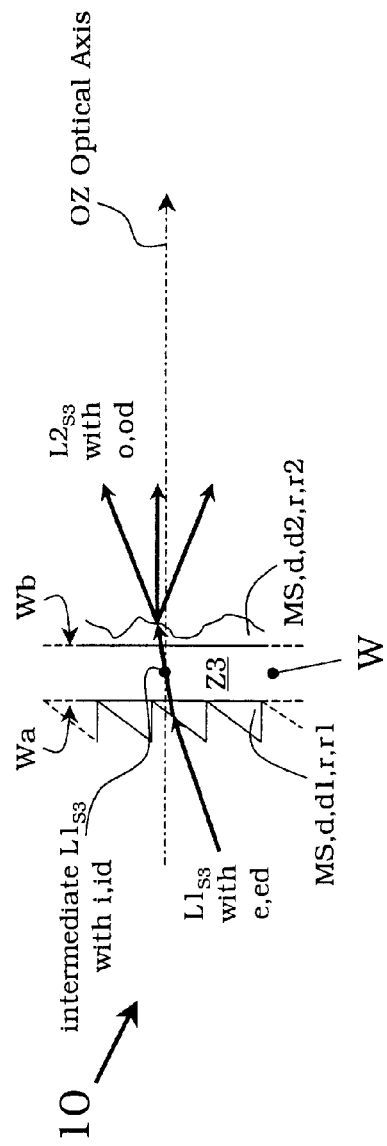

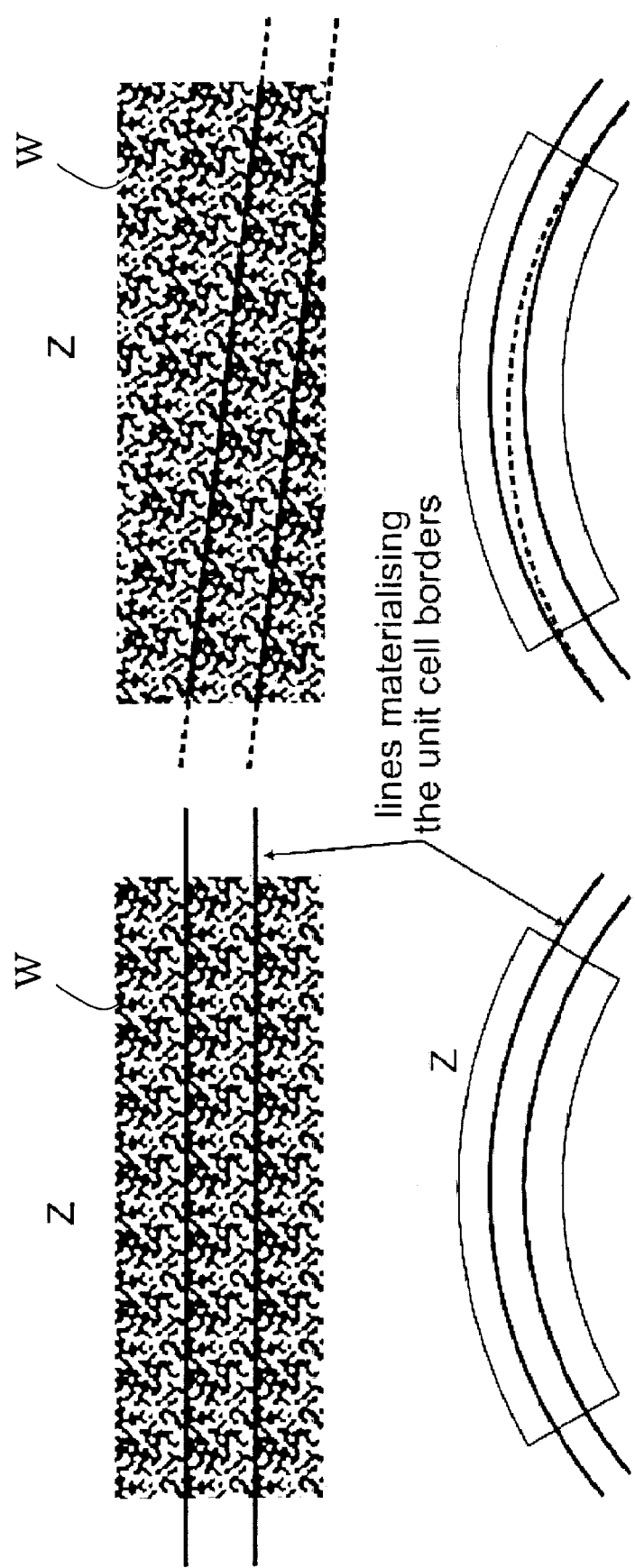

OPTICAL UNIT, LIGHT PROCESSING UNIT, LIGHT PROCESSING METHOD, ILLUMINATION UNIT AND IMAGE GENERATION UNIT

FIELD OF THE INVENTION

The present invention relates to a light processing unit making use of a transparent colour wheel element rotating around an axis, to a light processing method, to an illumination device including a light processing unit and to an image generation unit. More in particular, the invention relates to a display device for colour image making use of colour recombination, light shaping and speckle reduction and to an image display engine making use of the method and such a device.

BACKGROUND OF THE INVENTION

Display devices are important for many kind of electronic equipment and customer devices. The technical development in this field focuses amongst others on processes and devices for illumination, image generation and projection. It is, however, a well-known problem that illumination devices may loose a significant amount of primary produced illumination light because of an insufficient adaptation between for instance a broad band light source and respective spectral splitting devices or the like. On the other hand, it is also known in the art that illumination devices and respective light sources do not only generate light in a desired spectral channel with respective profiles and distributions of the generated radiation but also tend to inherently produce some parasitic or optical noise which is known in particular as speckles in colour image displays using coherent, e.g. laser light sources.

SUMMARY OF THE INVENTION

The present invention provides a light processing method and optical unit, an illumination unit as well as an image generating unit which are using a primary generated illumination light having a comparable high yield and which at the same time can be operated and employed with a reduced parasitic radiational noise. The object underlying the present invention is achieved by a light processing unit comprising a transparent colour wheel to be rotated around an axis and having a front face and a back face, at least one of said faces being provided with a micro-structure on said respective face designed to deflect, diffuse and redistribute light impinging on said front face uniformly such that light beams exiting said back face are oriented along an optical axis.

In order to display colour images, respective devices such as projectors need to recombine several monochromatic or single colour images. These elementary images are produced in accordance with the prior art by micro-displays that have to be illuminated uniformly. When a laser source is involved, parasitic noise called "speckle" is present due to scattering within the system. The present invention realizes the recombination of elementary images, beam shaping and homogenization of several colour channels onto the image formation devices and reduces the speckle due to the use of coherent light sources such as lasers with reduced number of parts that realizes the recombination, in particular by the use of specifically designed colour wheel.

According to the invention, said colour wheel contains at least three distinct radially equidistant zones, each zone being assigned to narrow-band light source. The rotational speed of a drive for said colour wheel is synchronized with switching means for sequentially switching on the light sources only when the respective light source beam area impinges on the associated zone on said colour wheel. In accordance with the present invention, said colour wheel is directly provided with and comprises means for receiving, reshaping, redistributing and/or redirecting received primary illumination light or as the case may be a plurality of individual components of such primary illumination light which after redistributing and redirecting compared to the primary illumination light is emitted as a secondary illumination light.

More specifically, front face zones of the colour wheel are structured and provided with sets of refractive elements, each set being assigned to one zone, the deflection angle of each set of said refractive elements being selected to counter the incident angle of the beam of the corresponding light source such that the light incident on the back face of the colour wheel is parallel to the optical axis. The back face of the colour wheel is provided with a hologram, in particular a computer-generated hologram, that redistributes the impinging light within a homogeneous pyramidal exit beam.

Due to the individual orientation, shaping and redistributing of light at the location of one element, the colour wheel, the invention combines in one the functionalities usually provided by three to four elements, for example the rod, the colour wheel, a primary reflector and a moving diffuser. When combined with synchronized laser sources, the invention has the advantage not to generate losses which are common with colour wheels of the prior art.

With the invention it is possible to design structures that perform functionality for several wavelengths since the colours are projected sequentially, the mirror structures in one zone or area are only designed for the associated wavelength and the need for a multiple-wavelength structure is avoided.

In an alternative embodiment of the colour wheel, front face zones thereof are provided with a hologram that distributes the beam of the corresponding light source within a pyramidal beam of defined angles with respect to the incident beam direction. With this embodiment of the colour wheel, the back face is structured with sets of refractive elements, each set being assigned to one zone. The deflection angle of each set of said reflective micro-prisms is then selected to counter the incident angle of the beam of the corresponding light source.

When using a hologram, specifically a computer-generated hologram, according to an advantageous embodiment, it is possible to provide only one side of said colour wheel, i.e. preferably the front face with a hologram, in particular a computer-generated hologram, that combines the function of redirecting the beam incident on the front face such that the light emanating from the back face is parallel to the optical axis, simultaneously providing the function of shaping said exiting light beam to be distributed within a homogeneous pyramidal beam.

Generally, and at the present state of the technology, it may be advantageous to provide two structures for beam shaping and light redirecting, one on each face of the colour wheel, namely e.g. a refractive micro-prism on one side and a hologram on the other side of the colour wheel. This solution helps to balance any possible deviation between the respective functions of the two structures resulting in less stringent fabrication constraints. Also the diffusion functionality can be distributed between the two surfaces of the colour wheel.

According to the present invention, a light processing optical unit comprises a light entrance section for receiving primary illumination light, a light processing section for processing said received primary illumination light for generating processed illumination light as secondary illumination light. The processing unit comprises one of said embodiments of said colour wheel which is adapted for receiving, in situ shaping, reshaping and/or redirecting said primary illumination light which may consist of one or a plurality of components to thereby generate a secondary illumination light with different properties when compared to the primary illumination light.

BRIEF DESCRIPTION OF THE DRAWINGS

The invention and advantageous features thereof will be explained with reference to preferred embodiments and with reference to the accompanying drawings in which

FIGS. 4A, B are schematic and cross-sectional side views which elucidate an aspect of a further embodiment of the light processing optical unit according to the present invention designed to diffuse and redistribute light energy uniformly;

FIGS. 6A to C and

FIGS. 7A to C elucidate by means of schematic and cross-sectional side views varieties of the working principle of a colour wheel provided according to an advantageous embodiment of the invention with a surface structure for generating a controlled refraction index, reshaping and redistributing;

FIGS. 12 to 15B elucidate parasitic optical noise and speckle reduction properties of embodiments of light processing optical units according to the present invention.

DETAILED DESCRIPTION OF THE INVENTION

In the following description of the invention and embodiments thereof, functional and structural similar or equivalent elements or components will be denoted with the same reference symbols, not in each case of their occurrence a detailed description will be repeated.

According to one aspect of the present invention, processing optical unit 10 is proposed which comprises a light entrance section E for primary light L1, a light processing unit P comprising a transparent colour wheel element W for processing said received primary illumination light in order to generate processed primary illumination light L1' thereof as secondary illumination light L2, and a light output section O for providing said secondary illumination L2.

The term "illumination light L2" as used herein is to be understood to also comprise individual or plural of light fractions or light components, e.g. primary illumination light components L1R, L1G, L1B, pre-processed components L1R', L2G', L2B' or secondary illumination light components L2R, L2G, L2B.

In the sense of the present invention, the components L1R, L1G, L1B, L1R', L1G', L1B' and L2R, L2G, L2B refer in general to certain spectral components or spectral ranges. These spectral components or spectral ranges are not restricted to RGB colours or any other set of spectral ranges, but they may be RGB colours.

The colour wheel W comprises a front face Wa for receiving said primary illumination light L1; it further comprises a second back face Wb for emitting said secondary illumination light L2. The colour wheel W further comprises a plurality of distinct zones $Z_j$; j=1, 2, 3, which may be formed as individual sections, sectors, segments or as rings of said colour wheel. The number of zones is not limited to one, two or three, but may be higher depending on the number of light components to be processed. Usually, the number of zones will be three distinct radially equidistant zones, each zone being assigned to a narrow-band light source.

Figure 3A:
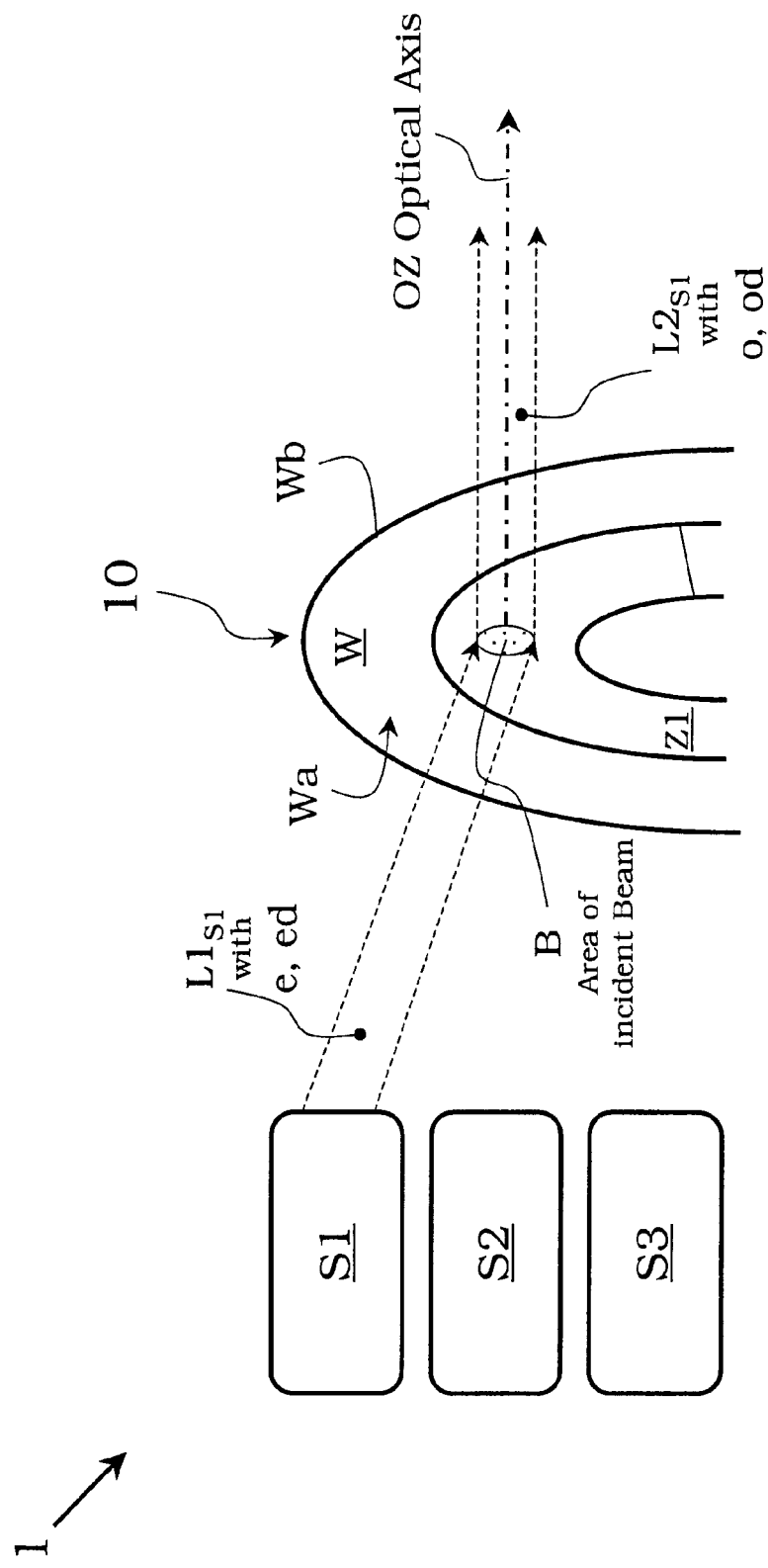
FIGS. 3A to C elucidate by means of schematic and cross-sectional side views the working principle of an embodiment of a light processing optical unit with a colour wheel according to the present invention.

Each zone $Z_j$ of the colour wheel W is adapted and comprises means for receiving as said primary illumination light L1 light of given and defined spectral range from a defined entrance direction e or a range ed of light entrance directions (FIG. 3A). The zones $Z_j$ of the colour wheel comprise means for emitting as said secondary illumination light L2 a light of predefined spectral range in a defined light output direction o or a range of light output directions Od. The respective light output direction o or directions Od of said plurality of zones $Z_j$ may be identical and may coincide or are parallel to a common axis OZ of an optical path.

The colour wheel W is rotatable about a rotational axis RZ. The common optical axis OZ of said plurality of zones $Z_j$ is given by a certain inclination angle with respect to the rotational axis RZ and is parallel with respect to the rotational axis RZ.

Aspects of and Best Modes for Carrying Out the Invention

Figure 1:
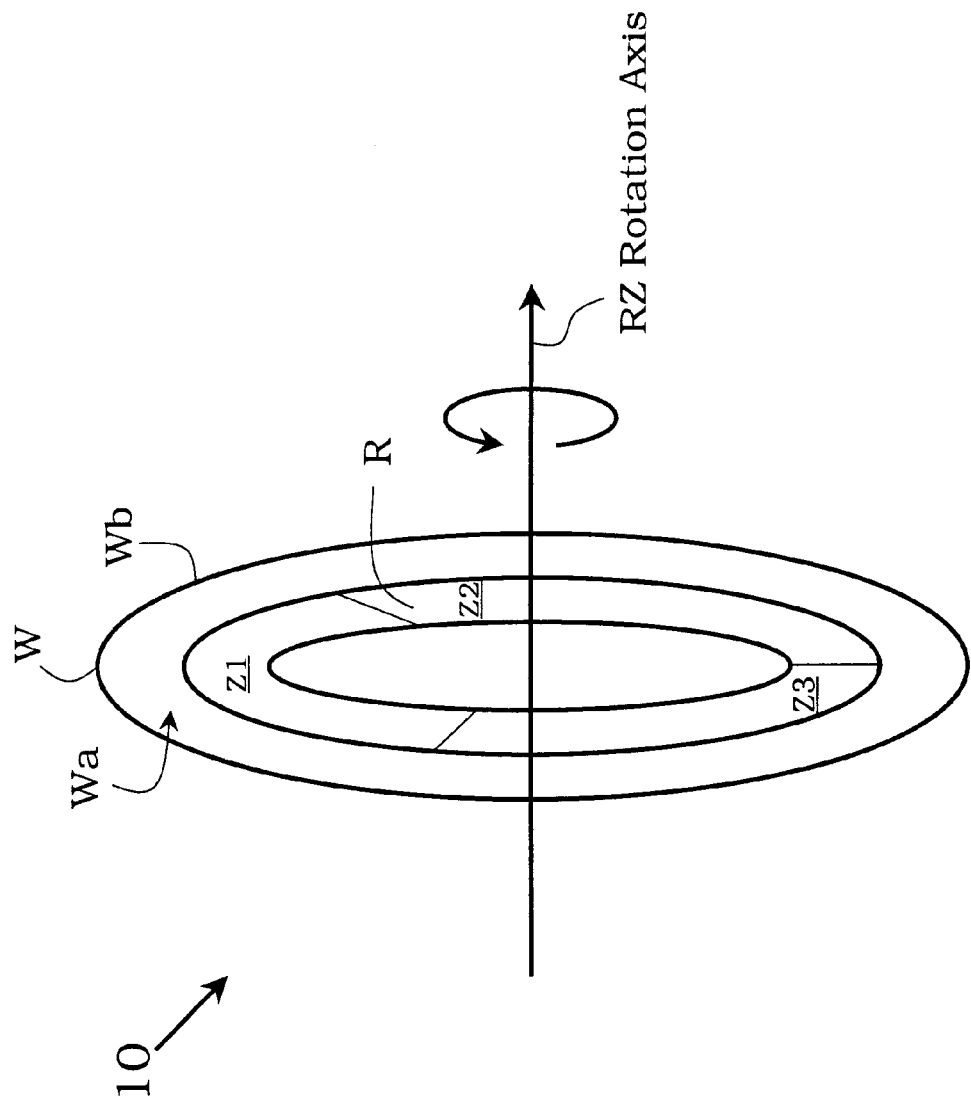
FIG. 1 is a schematic and cross-sectional view of a first embodiment of the light processing optical unit consisting of a colour wheel according to the present invention.

As shown in FIG. 1, a basic entity of the processing optical unit 10 is the colour wheel W comprising a front face Wa and a back face Wb. In the embodiment of FIG. 1, the color wheel W is formed as a circular transparent disc rotatable about a central rotational axis RZ which is perpendicular to the disc plane of the colour wheel W. A ring section R of the colour wheel is divided in three zones Z1, Z2, Z3 which comprise means for reshaping, redistributing and redirecting said primary illumination light L1. In FIG. 1, said primary illumination light L1 is redirected with an output direction O which coincides with an optical axis OZ in z-direction which is parallel to the rotational axis RZ. However, alternatives for the optical axis OZ' in directions z' having a non-vanishing inclination angle with a rotational axis RZ are also possible. The number of zones Zj (Z=1, 2, 3) should be at least 3 for colour images, but can be higher.

Figure 2:
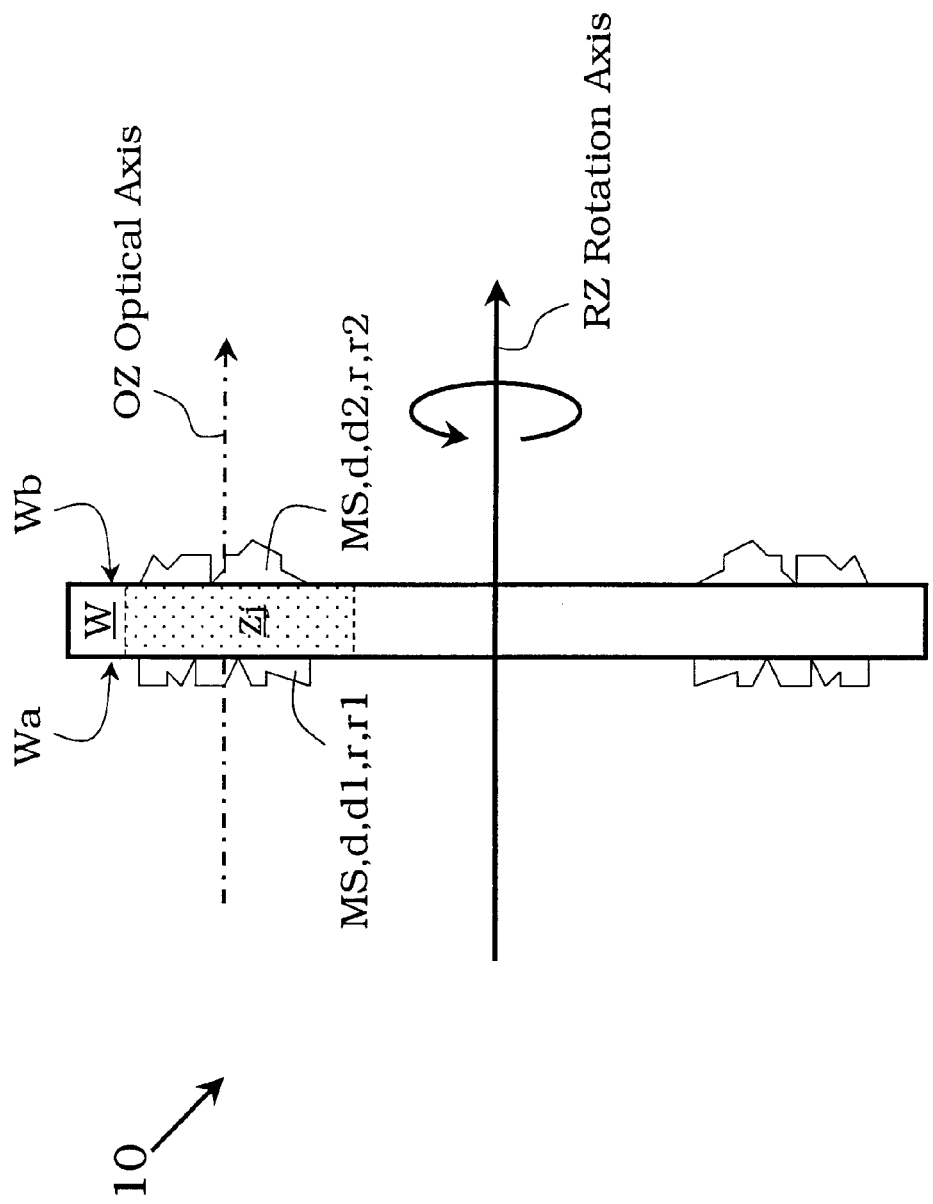
FIG. 2 is a schematic and cross-sectionally enlarged side view of a zone of the colour wheel of FIG. 1.

FIG. 2 is a cross-sectional side view of an enlarged cutout of the colour wheel W shown in FIG. 1. Each zone $Z_j$ is composed of a set of microstructures MS situated on or at said front and said back faces Wa and Wb, respectively, and serving as deflecting means d, d1, d2 or as reshaping and redistributing means r, r1, r2. The microstructures MS may be different for each zone $Z_j$.

Figure 3B:
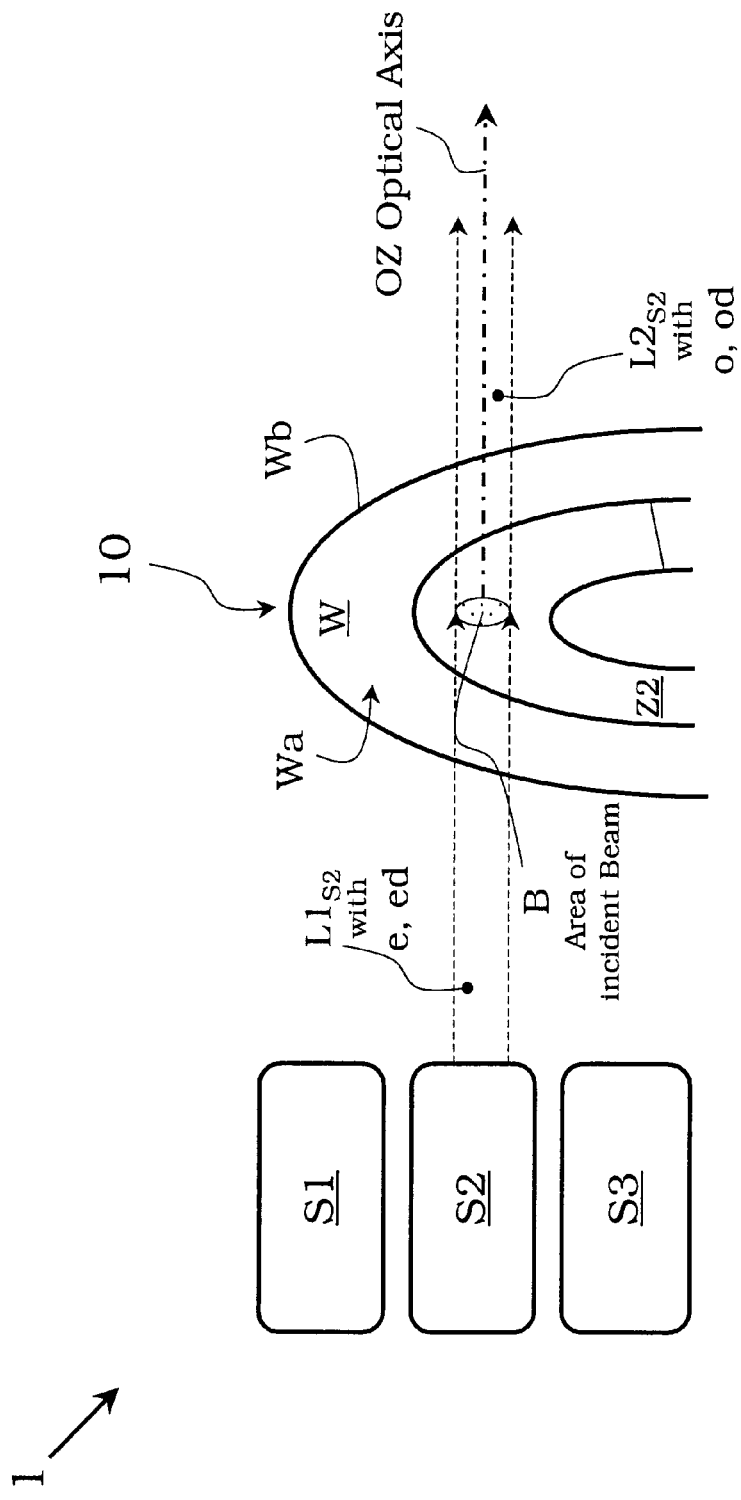
Figure 3C:
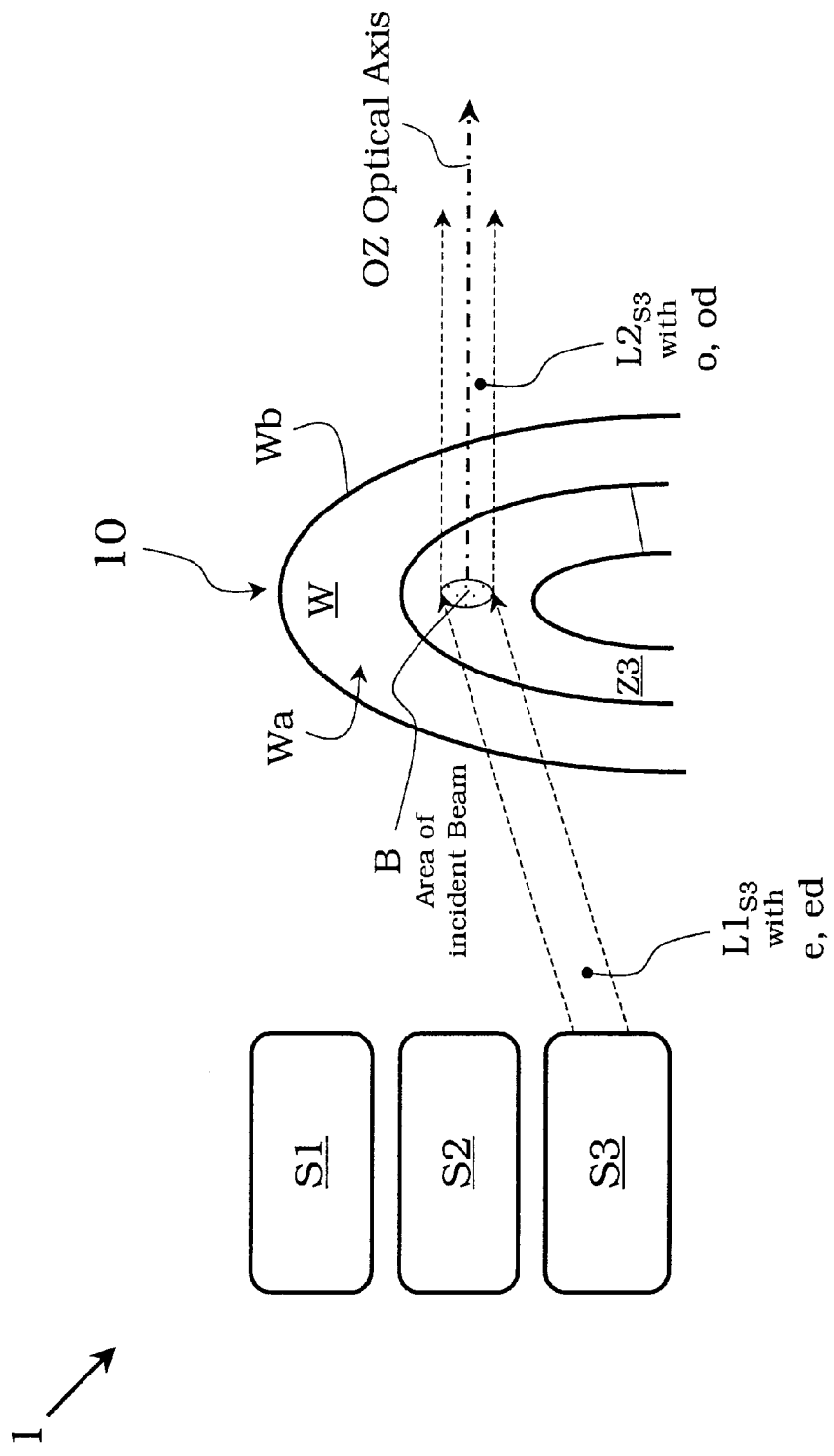

FIGS. 3A to 3C serve to explain the working principle of the light processing optical unit 10 according to the present invention and present a situation with light source unit 20 having in this exemplifying embodiment three light sources S1, S2, S3. The general invention may have any plurality of light sources S1, . . . , Sj, . . . , SN. Each light source S1, S2, S3 produces a respective primary illumination light which may be a non-overlapping spectral component of the primary illumination light L1. As can be seen from the sequence of FIGS. 3A to 3C, the illumination by the respective light sources L1, L2, L3 is synchronized with the rotation of the colour wheel W about rotational axis RZ and with an assignment between the zones $Z_j$ (j=1, 2, 3) and the light sources $S_j$ (j=1, 2, 3) in the sense that at each instant of time only one light source $S_j$ is active for illumination, whereas the other light sources are shut down, whereby only the assigned zone $Z_j$ is illuminated by the respectively associated light source $S_j$. As can be seen from the sequence of FIGS. 3A to 3C, the respective primary illumination lights $L1_{S1}$, $L1_{S2}$, $L1_{S3}$ have respective entrance directions e and entrance distributions ed. By interaction with the respective microstructures MS and the respective deflecting means d, d1, d2 or redistributing means r, r1, r2 are redirected in the common direction z of the optical axis OZ corresponding to the output direction o and having a respective output distribution od when leaving the colour wheel W as secondary illumination light components $L2_{S1}$, $L2_{S2}$ and $L2_{S3}$ of said secondary illumination light L2.

Each zone $Z_j$ is e.g. associated to a narrow-band light source $S_j$, such as an LED or a laser. These sources $S_j$ may contain primary optics such as lenses to expand and collimate the beam. The light beams emitted by these sources fall onto the colour wheel W, in particular into a respective incident beam area B as shown in FIGS. 3A to 3C. This area B may be centered on the optical axis OZ, e.g. normal or perpendicular to the colour wheel W. The light sources $S_j$ are synchronized with their associated zones $S_j$. When the colour wheel is rotated around its rotational axis RZ, a given light source $S_j$ is active (switched on) only when the beam area B is in the associated or assigned zone $Z_j$. FIGS. 3A to 3C present a situation for three sources S1, S2, S3. When the beam area B is in the zone Z1, the source S1 is turned on, S2 and S3 are off. S2 is turned on when the beam enters the zone Z2, and S1 is turned off. S3 is turned on when the beam B is in zone Z3 while source S1 and source S2 are off.

FIGS. 4A and 4B illustrate by means of enlarged schematic and perspective side views in more detail the output situation for the secondary illumination light L2. As can be seen from FIGS. 3A and 3B, based on the optical axis OZ as a primary output direction od for the secondary illumination light L2, one obtains a pyramidal radiation distribution with lateral and vertical angles AY and AX, respectively, with respect to the optical axis OZ and a primary output direction od of said secondary illumination light.

The microstructures MS (FIG. 2) on the surfaces Wa, Wb of the colour wheel W are designed to diffuse and redistribute the light energy uniformly within a rectangular pyramid whose angles AX and AY are presented in FIG. 4A and 4B as explained above. Additionally, the microstructures MS have to deflect the incident light beam so that the exiting pyramidal beams are all oriented along the optical axis OZ. Such microstructuring of the colour wheel W can be realized with kinoforms, as explained in U.S. Pat. No. 3,606,515, and designed with algorithms similar to the one presented in U.S. Pat. No. 3,619,022.

FIGS. 5A to 5C and 6A to 6C illustrate two solutions to perform a light beam shaping and redirection of the light, in the case of three light sources S1, S2, S3 positioned as in FIGS. 3A to 3C. A section of the colour wheel W located inside the beam area is shown. The direction of the light is symbolized by an arrow.

Figure 5A:
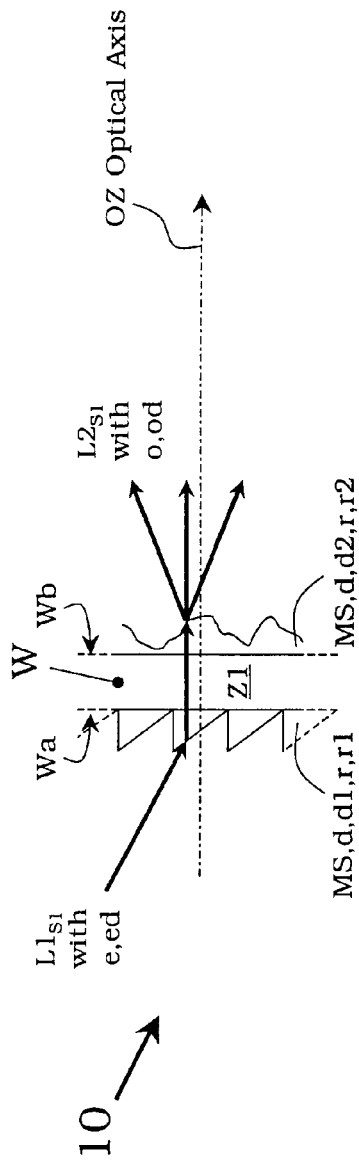
FIGS. 5A to C
Figure 5B:
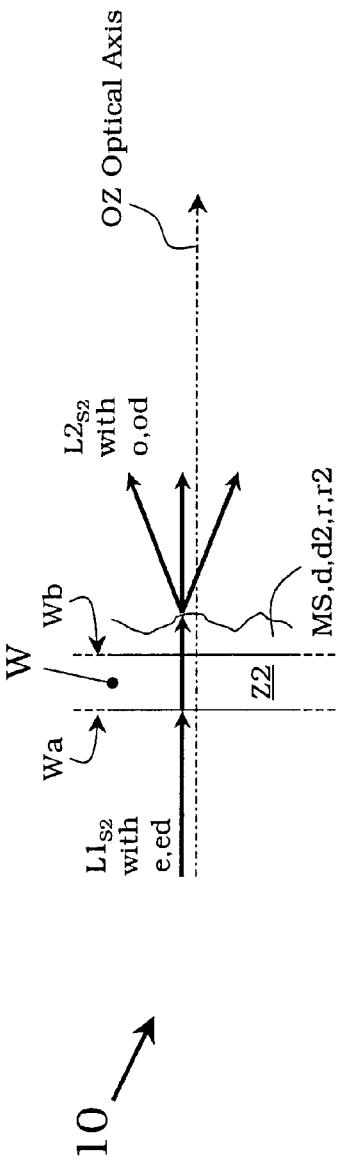
Figure 5C:
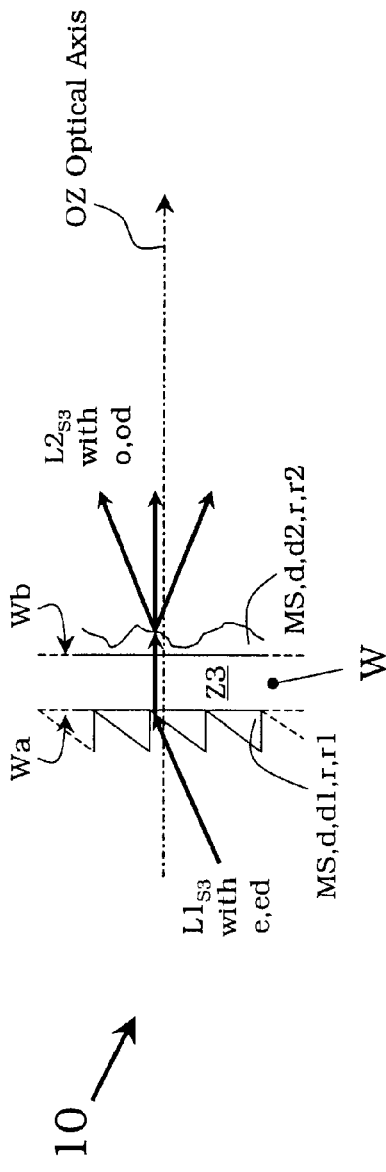

With reference to the schematic and cross-sectional side views of FIGS. 5A to 5C, the light processing optical unit 10 according to the present invention may have different realizations.

In a first embodiment as shown in FIGS. 5A to 5C, the colour wheel W comprises deflecting or redirecting means d, d1 and/or as a part of said front face Wa in each zone Z1 to Z3. After having interacted with said means d, d1 at the front face Wa, the respective primary illumination light components $L1_{S1}$, $L1_{S2}$, $L1_{S3}$ are in each case deflected and redirected from their respective entrance direction ed to the common output direction OD which is essentially parallel to the optical axis OZ and parallel to the rotational axis RZ of the colour wheel W. Therefore, the intermediate direction id after interaction at the front face Wa is identical to the final output direction od. The already redirected, but not yet reshaped and redistributed primary illumination light L1 interacts with the reshaping and redistributing means r, r2 which are provided on the back face Wb of the colour wheel W.

The deflecting or redirecting means d, d1 and the reshaping and redistributing means r, r2 are in each case of FIGS. 5A to 5C for the different zones Z1 to Z3, respectively, spatially separated microstructures MS. Therefore, the redirecting and deflecting functionality on the one hand, and the reshaping and redistributing functionality on the other hand, are also spatially separated at the front face Wa and at the back face Wb.

As the entrance direction ed for the second primary illumination light component L1L2 of said primary illumination light L1 coincides with the direction of the optical axis OZ and with the output direction od, the deflecting and redirecting means d, d1 for the second primary illumination light component L1S2 and the second zone Z2 is simply a planar structure exerting at least a parallel shift but not deflection.

In FIGS. 5A to 5C, the front face Wa of zone $Z_j$ is structured by a micro-structure MS with a set of refractive micro-prisms whose deflection angle counters the incident angle of the beam for the corresponding source $S_j$. The light incident on the back face Wb of the colour wheel W is thus parallel to the optical axis OZ. The back face Wb contains e.g. a computer-generated hologram whose function is to redistribute the light within a homogeneous pyramidal beam. It is possible to invert the order of the two faces without effecting the overall optical functionality.

In FIGS. 6A to 6C only one face of the colour wheel W is patterned with a computer-generated hologram combining the two functions, i.e. redirection and beam shaping. The deflecting/redirecting functionality as well as the reshaping and redistributing are concentrated at the front face Wa by structurally and geometrically combining the respective deflecting and redirecting means d, d1, on the one hand, and the reshaping and redistributing means r, r1 in one single microstructure MS on the front face Wa, on the other hand, in each of the zones Z1, Z2, Z3 aside to the respective primary illumination lights, $L1_{S1}$, $L1_{S2}$ and $L1_{S3}$, respectively. According to this embodiment, the primary lights are simultaneously deflected/redirected and reshaped/redistributed. The back face Wb is designed planar.

FIGS. 7A to 7C represent a third structuring of the colour wheel W, wherein the first structure is not doing all of the deflection function as in FIGS. 5A to 5C, but only partially deviates the light beam. A second structure MS at the back face Wb is then realizing the final deviation together with beam shaping, as in FIGS. 6A to 6C. The range of achievable deviation of a light beam by defractive optics is limited by the fabrication technology. The solution of FIGS. 7A to 7C can be used to balance this deviation between the two structures, resulting in less stringent fabrication constraints. Similarly, the diffusion functionality can be distributed between the two surfaces.

More in detail, in FIGS. 7A to 7C, the deflecting and redirecting functionality is subdivided into partial deflection and redirecting functionalities by realizing first deflecting and redirecting means d, d1 at the front face Wa, and by providing additional second deflecting and redirecting means d, d2 at the back face Wb, for each zone Z1, Z2, /3 being assigned to the respective first to third primary illumination lights $L1_{S1}$, $L1_{S2}$, $L1_{S3}$. After interaction of the primary illumination lights with the first deflecting and redirecting means d, d1 at the front face Wa, the lights are deflected and redirected from the respective entrance direction e to an intermediate direction i which does not yet coincide with the desired output direction o, however, after interaction with the second deflecting and redirecting means d, d2 at the back face Wb of the colour wheel W an additional deflection or redirection is obtained to achieve the desired output direction o for the respective illumination light. Simultaneously with the second deflecting and redirecting process the reshaping and redistributing functionality is realized. Therefore, at the front face Wa a pure, but partial redirection and deflection is realized by the respective first microstructure MS realizing the first deflecting and redirecting means d, d1 and with the back face Wb combined functionality is realized by a second microstructure MS in order to complete the deflection and redirecting.

The micro-prisms presented in FIGS. 5a to 5C and 6A to 6C can be replaced with a structure whose features are smaller than the wavelength. Such sub-wavelength structure generated a controlled refraction index that can be varied along the respective zone. If the variation is similar to the profile of the micro-prisms, the sub-wavelength structure performs the same functionality. The chosen solution depends on the fabrication technology available. Combining all the functionality on one surface is more demanding for the design and for the technology, but it may result in a less expensive fabrication in the end.

When a diffractive optical element like the microstructure MS is designed, the height of the structure is related to the wavelength of the light used with this element. Since each zone $Z_j$ is designed for its own wavelength, the fabrication must be able to create microstructures with ideal height for each wavelength. Laser writing and e-beam writing can fulfill such conditions that could be hard for photo-lithography. Once a reference element has been created, it can be duplicated by any of the replication technologies, such as hot-embossing, injection molding, or UV-curing.

Figure 8:
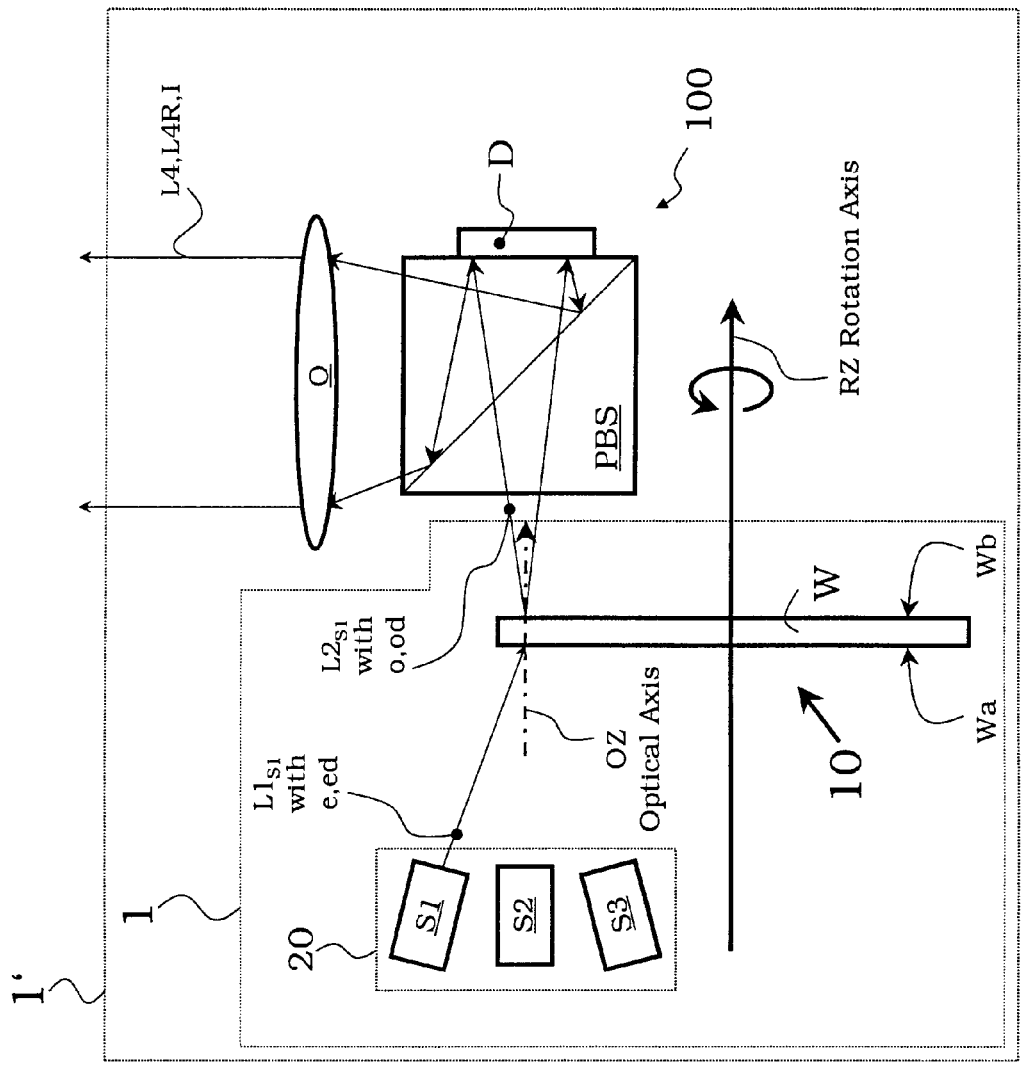
FIGS. 8 to 10 are schematic and cross-sectional side views of an arrangement of optical and electrooptical components including a colour wheel elucidating aspects of various embodiments of an image generation unit according to the invention.

FIG. 8 is a schematic and cross-sectional side view of an embodiment of the image generation unit 1'. In this embodiment, the light processing optical unit 10 is illuminated by the light source 20 having a plurality of three different sources S1, S2, S3, for instance. The provided secondary light L2 is irradiated into a polarization selective beam splitter PBS of an image modulator unit 100' in order to complete illuminate a display D or image modulator 100 thereby generating sequentially first to third partial images corresponding, for example, to first to third components L4R, L4G, L4B of image light L4 which is then imaged on a screen by an objective O.

When used within a projection display engine, the image formation device, such as micro-display, is positioned so that the pyramidal beam covers the active area. FIG. 8 illustrates the complete projection display engine with a reflective liquid crystal micro-display G, e.g. of LCoSLCoS type, but other types of micro-displays, such as transmissive liquid crystals or reflective and transmissive optical MEMs can be used.

Figure 9:
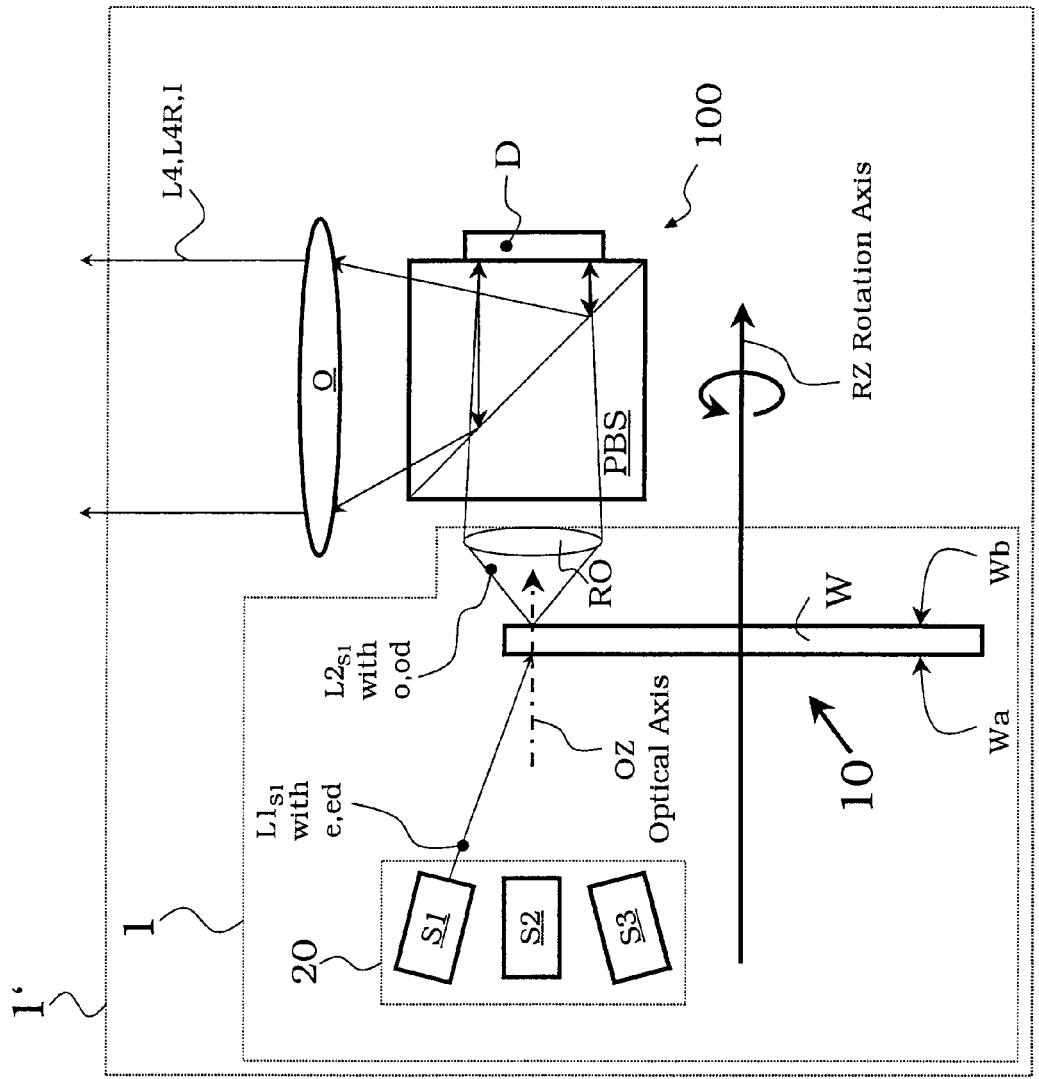

In the embodiment shown in FIG. 9, the image generation unit according to the present invention comprises additionally a field lens RO for focusing respective secondary illumination light components L2R, L2G, L2B, for example, onto the polarization selective beam splitter PBS and the image modulator 100. FIG. 9 is therefore a variant using relay optics RO to project the rectangular beam onto the micro-display D.

Figure 10:
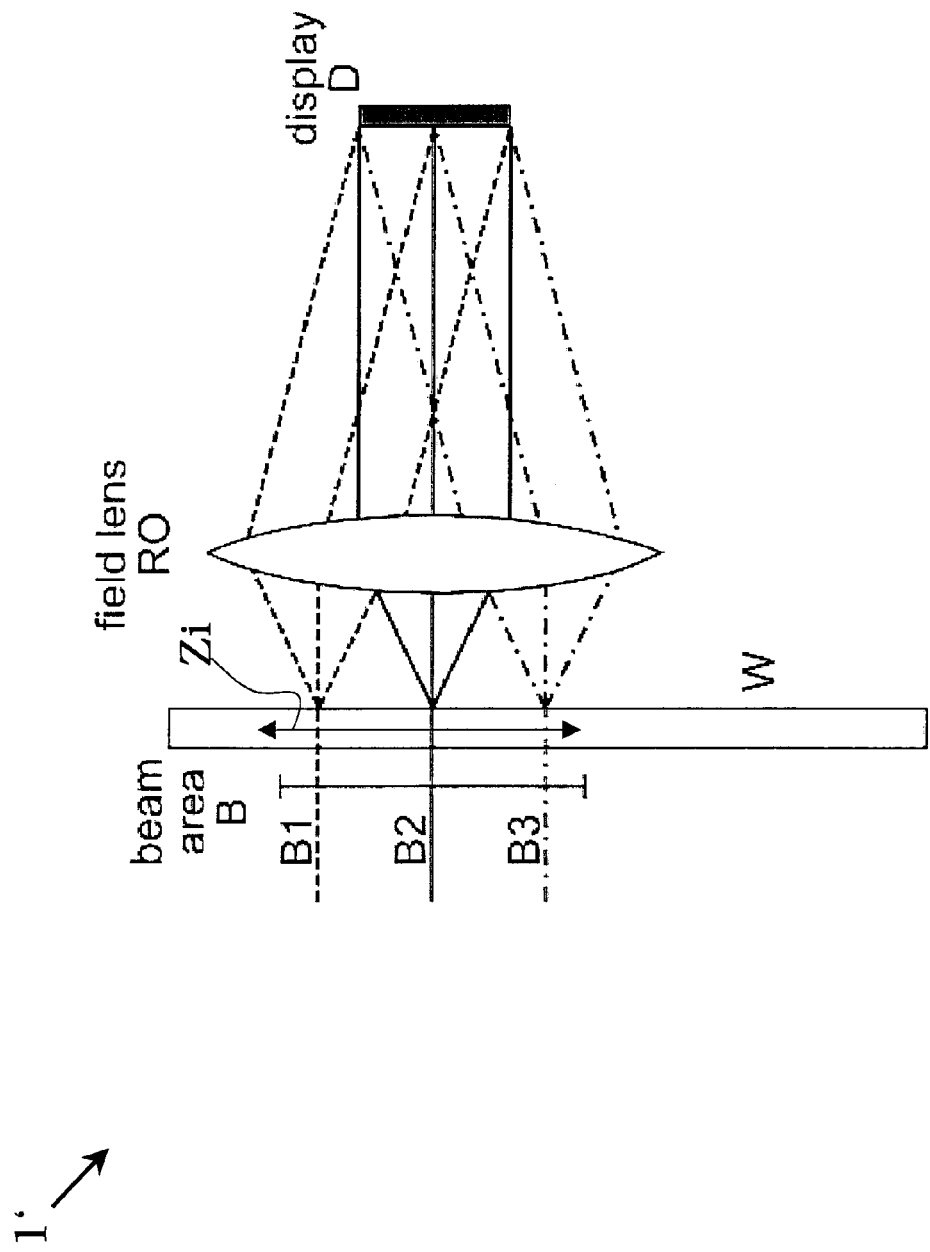

FIG. 10 demonstrates in more detail the functionality of the field lens RO of FIG. 9. When the relay optics RO is used as a field lens in a Fourier configuration, it is possible to combine several sources Sij of the same wavelength within a zone Zi, as shown in FIG. 10. The beams B1, B2 and B3 are shaped in parallel and superimposed onto the micro-display.

Figure 11:
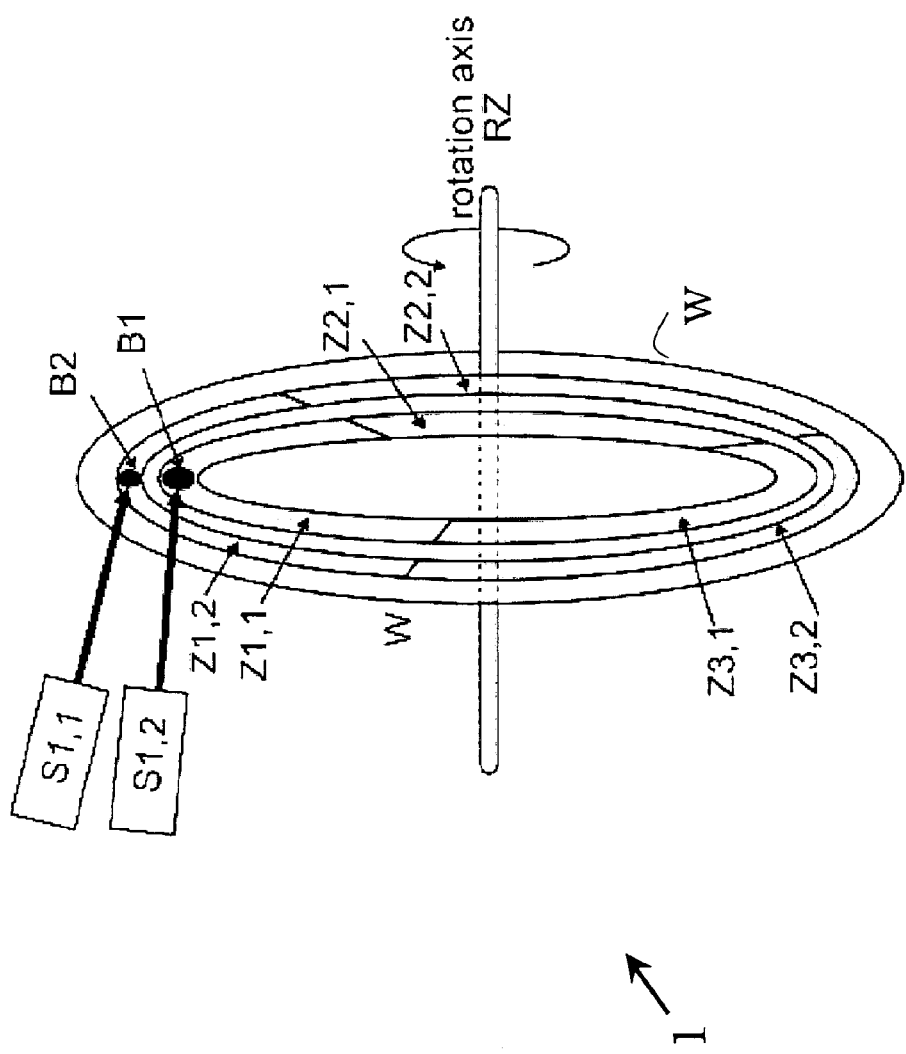
FIG. 11 is a schematic and cross-sectional side view of a colour wheel according to the present invention on which light beams impinge at different angles of incidence.

FIG. 11 visualizes a further embodiment of the illumination unit 1 according to the present invention. For a given spectral component a plurality of light sources S1,1 and S1,2 can be provided and a respective plurality of first zones Z1,1 and Z1,2 have to be provided on the colour wheel element W of the respective embodiment of the light pre-processing optical element 10. In the embodiment of FIG. 11, the respective zones Z1,1, Z1,2; Z2,1, Z2,2 and Z3,1, Z3,2 are shown as sectors of concentric rings of the circular disk of the respective colour wheel W. A first sector Z1,1 is assigned to the first light source S1,1 for a first primary illumination light component L1R and a second of the first sectors Z1,2 is assigned to the second light source S1,2 for the first primary illumination light component, e.g. L1R.

FIG. 11 illustrates the case where the beams fall upon the colour wheel W with different angels of incidence. Zone Zj is divided in concentric tracks Zi,j whose structures provide a different deflection angle, adapted to their associated light source Si,j.

For the wavelength number 1, the sources S1,1 and S1,2 emit light beams that reach zone Z1 of the colour wheel W, respectively, in areas B1 and B2. The two beam areas B1 and B2 are, respectively, in sectors Z1,1 and Z1,2. The light emerging of the colour wheel W can then be combined with the configuration of FIG. 10.

Figure 12:
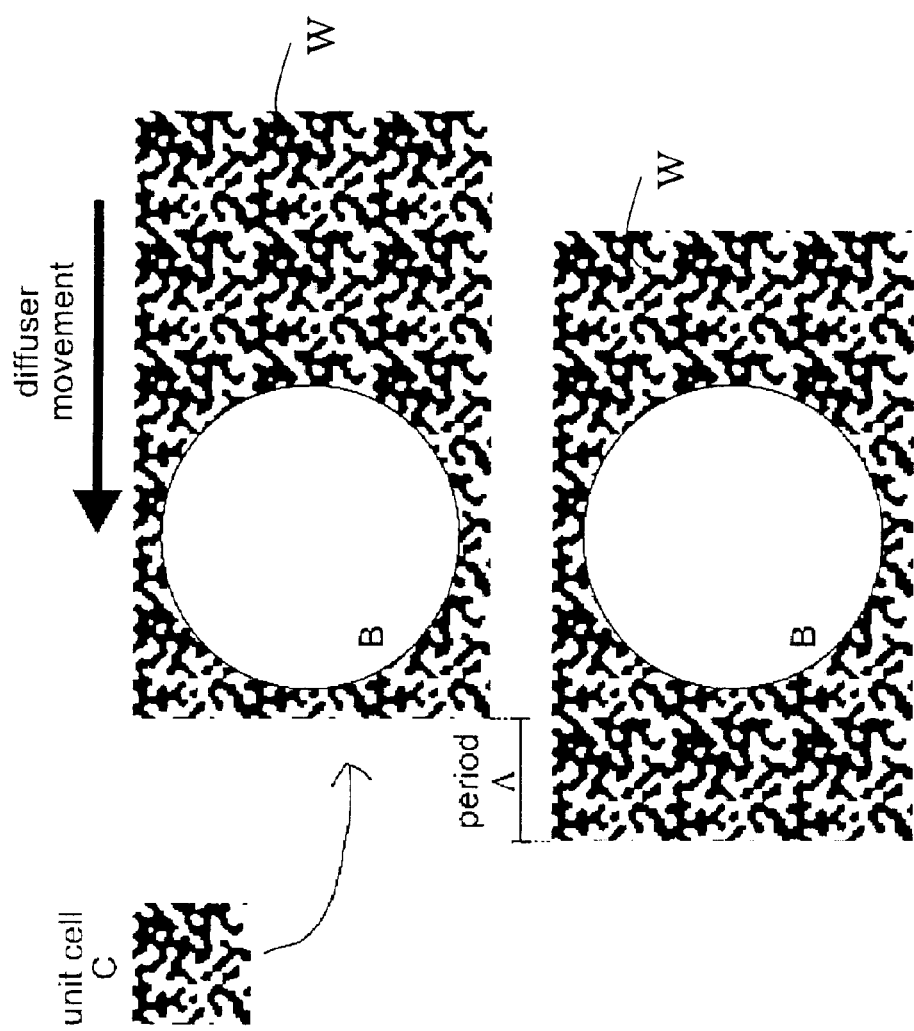
Figure 13:
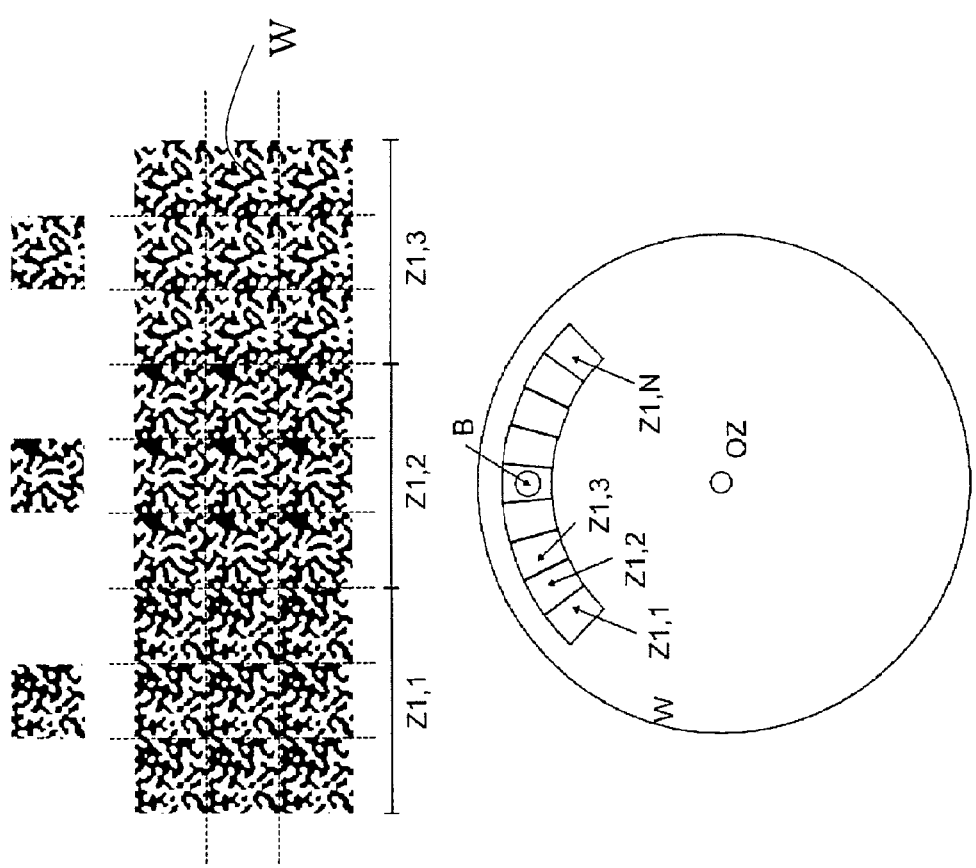

When a coherent light source is used in an optical system, containing scatterers, speckle, a noise phenomenon is introduced. The screen, the micro-display and the micro-structured diffuser on the colour wheel are such potential sources for speckles. In addition, the distribution of light generated by a computer-generated hologram exhibits spikes and dark areas due to some interference phenomena. For example, the diffusing beam-shaping elements are most-often periodic structures. FIG. 12 shows an example of such an element.

FIGS. 12 to 16B demonstrate how parasitic optical/radiational noise or speckles reduction property can be included into the reshaping/redistribution means d, d1, d2. The unit cell C needs to be tiled periodically for the beam-shaping effect to take place. FIG. 12 visualizes a 3 times 5 arrangement of the cell C. The area of incidence of the light beam B is depicted on top of this arrangement. Because of the fast rotation of the colour wheel W, the diffuser pattern is moving with respect to the light beam B. This movement modifies the pattern of the speckles, resulting in a time averaging of the noise when viewed by a human eye. However, when the diffuser has been translated by a period A, corresponding to the cell size, the light beam interacts with strictly the same pattern. The speckle distribution resulting from the diffuser on the screen is thus periodically repeated. To maximise the reduction of the speckles, the pattern should always be different within one colour frame. Thus, the diffuser's pattern should not repeat more than necessary within one zone Zi.

To achieve this goal, one can design several independent diffusing patterns and tile them in small arrays. Such a set-up is presented in FIG. 13, where three distinct cells are assembled in three arrays of 3 times 3 cells. The dashed lines are guidelines to emphasize the limits of the unit cells. This solution results in the sub-sectors Zi,j shown in the bottom part of FIG. 13, each sub-sector containing a distinct computer-generated hologram pattern.

Another arrangement to smooth the light distribution and to reduce speckles is shown in FIGS. 14A-D. The top row illustrates the situation for a straight zone Z, while the bottom row shows the same concept for the annular shapes. The left column shows the periodic situation and the right column the way to break the periodicity. The thick lines materialize the borders of the unit cell, plain for the periodic situation, dashed for the non-periodic one. The pattern is rotated with such an angle that the periodicity disappears from the perspective of the light beam. In the annular arrangement, the circular lines of the unit cell become spirals. The arrangement of FIGS. 14A-D is easier to design than the one of FIG. 13. It also avoids artifacts introduced by the discontinuity between neighbouring cells. On the other hand, the variability of the speckle pattern is lower, and hence the reduction of the speckles is lower.

Figure 15B:
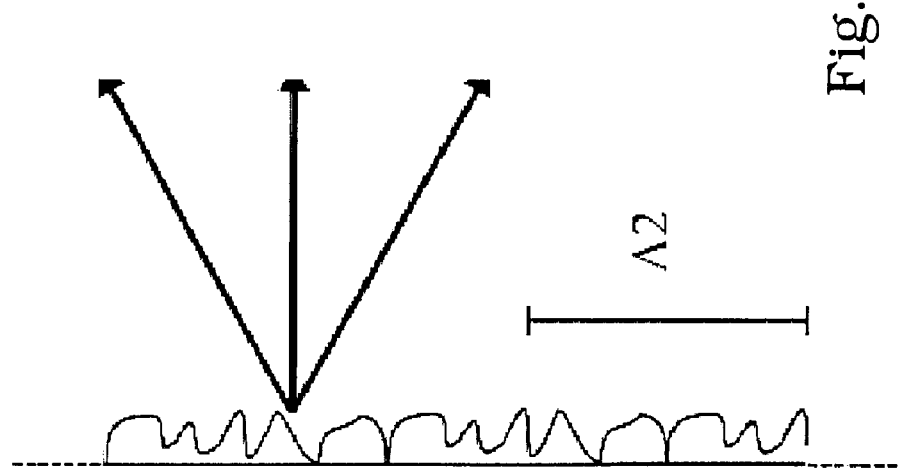
Figure 15A:
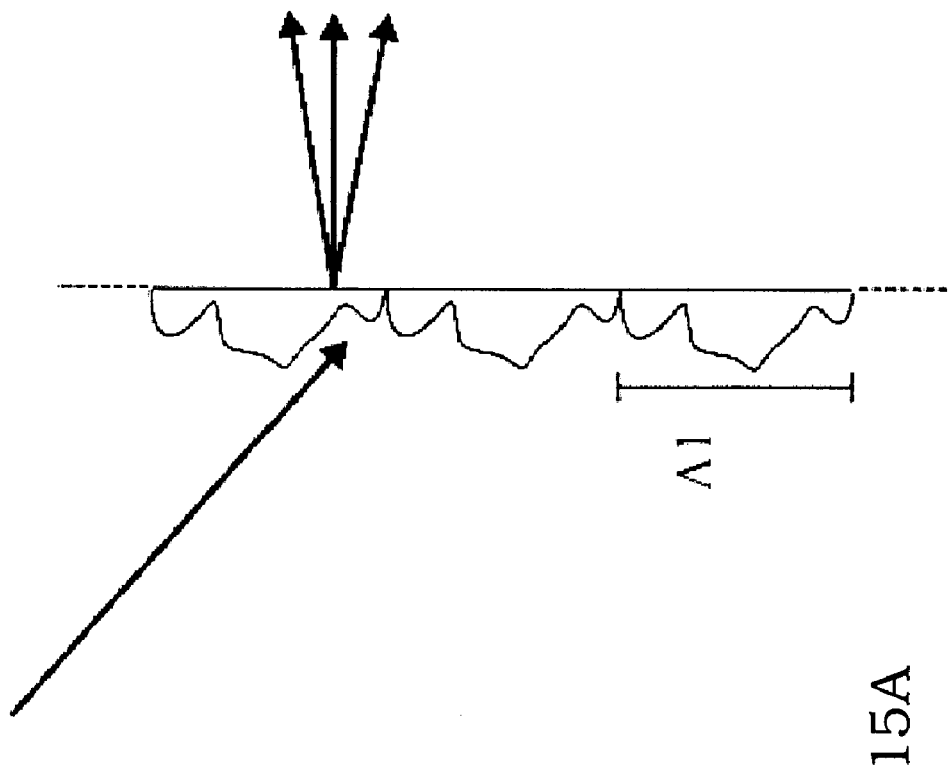

FIGS. 15A and 15B illustrate two variants of a third configuration that would break the overall periodicity of the structures while maintaining the local periodicity. When both faces of the colour wheel are patterned with structures of different periods $\Lambda 1$ and $\Lambda 2$, the overall period $\Lambda$ is given by $1/\Lambda = 1/\Lambda 1 - 1/\Lambda 2$. By choosing a mismatch between the periods on each face, one can thus select the overall periodicity of the structure.

Figure 16:
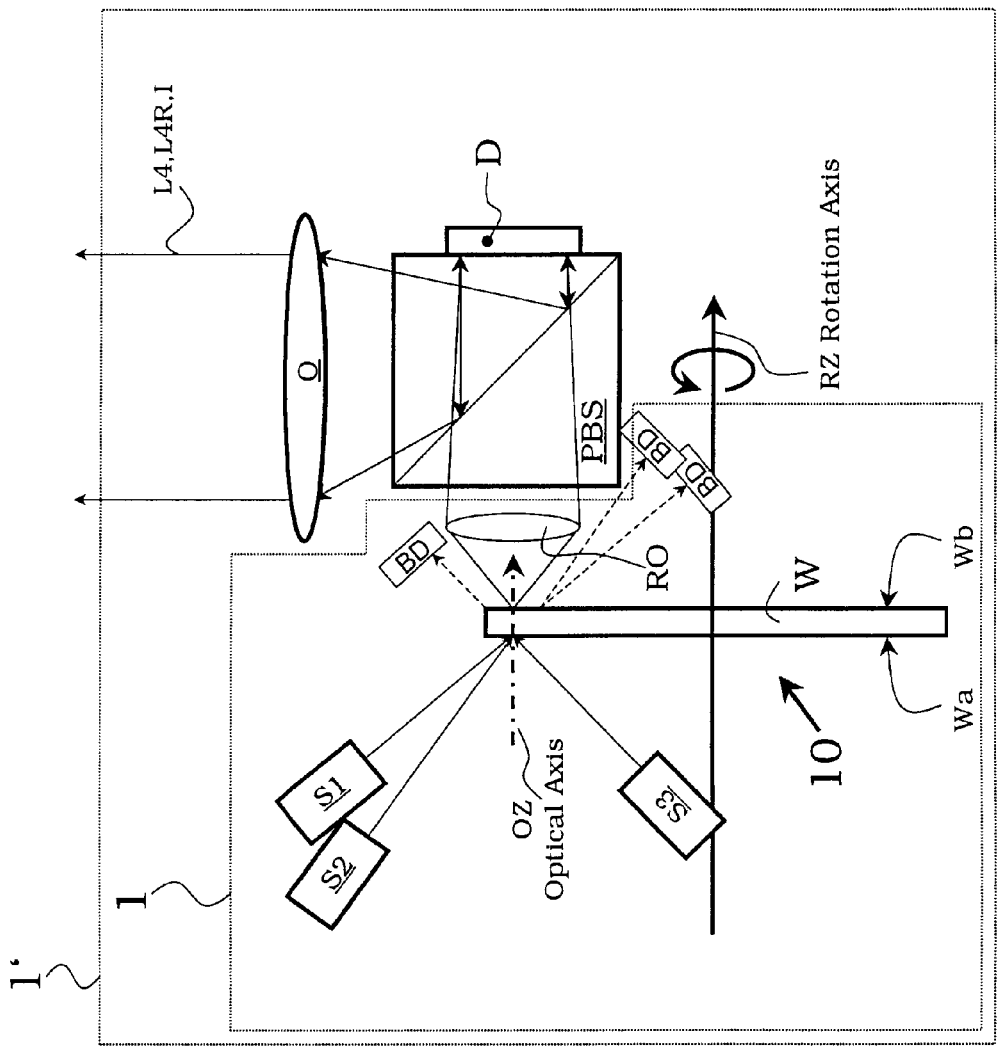
FIG. 16 is a schematic and cross-sectional side view of a further embodiment of an image generation unit according to the present invention.

The embodiment of FIG. 16 is comparable to the embodiments shown in FIGS. 8 and 9, however beam dumps BD, optical absorbers are provided in order to increase the security aspects for the user in case that laser beams are used as light sources.

Laser projection systems can present safety issues since a laser beam conveys a very high density of energy. Once the beam has been diffused by the colour wheel W, the danger is suppressed since the energy is irreversibly spread within the rectangular pyramid of FIGS. 4A-B. The aspect of laser safety is thus primarily reduced to the situation where the colour wheel W would disappear of the system (rupture, misalignment). FIG. 16 illustrates how the system can be designed so that, in the absence of the colour wheel W, the light beams do not enter the imaging optics (the objective O) and are confined within the engine. The directions of the beams when the device is not present are chosen in a way they do not enter within the aperture of the imaging optics. Instead, beam dumps BD are used to capture such beams. FIG. 16 is a two-dimensional schematic view, but the third dimension can also be used to select the position of the sources Si. By grouping the deflection and diffusion functionalities in one part, we ensure that no laser ray exits the engine and hurts the viewer.

Some significant advantages of the present invention are the following:
- the functionalities usually provided by a plurality of elements, for example three to four elements like a rod, colour wheel, primary reflector and moving diffusers etc. are combined in one element, the rotating colour wheel;
- the structuring of the colour wheel in respective radially separated zones combined with synchronized laser sources significally reduces losses which are common to colour wheels as used in the prior art;
- speckles introduced in the system by the screen and other scattering elements are significantly reduced;
- since the respective colours of an image are projected sequentially in accordance with the invention, the microstructure in one area has to be designed only for the associated wavelength. The need for a multiple wavelength structure is suppressed which usually results in a poor performance, tedious design and hardly manufacturable structures.

The invention claimed is:

1. An optical unit, comprising:
a light source to emit light;
a color wheel configured to modify direction and shape properties of the light incident on the color wheel, the color wheel being rotatable controlled by an electromechanical device, and at least one of a front face and a back face of the color wheel having a textured portion; and
a monitoring device configured to (1) monitor a rotation and rotational position of the color wheel and (2) modulate the light source depending of the rotational position of the color wheel modify the rotation of the color wheel.

2. The optical unit according to claim 1,
wherein said front face and said back face have textured surfaces.

3. The optical unit according to claim 1,
wherein the textured portion comprises combinations of diffractive means, refractive means and diffusing means having structures larger or smaller than a wavelength of the light, wherein a combination of the combinations is sensitive to a polarization of the light.

4. The optical unit according to claim 1,
wherein a space comprised between the front face and the back face of the color wheel is structured in volume, as a variation of a complex refraction index, that is a variation of index of refraction, reflectivity and absorption.

5. The optical unit according to claim 1,
wherein the front face or the back face is covered with a reflecting material or structure.

6. The optical unit according to claim 1,
wherein the textured portion of the wheel has a structure that deflects and shapes the light so the distribution of light after interaction with the color wheel provides defined angular distribution of light power.

7. The optical unit according to claim 1,
wherein the light source includes several light emitters.

8. The optical unit according to claim 1,
wherein the color wheel is divided into N zones.

9. The optical unit according to claim 8,
wherein the zones are shaped as sectors or annular segments of sectors.

10. A light processing unit, comprising:
a transparent color wheel to be rotated around an axis and having a front face and a back face, at least one of said faces being provided with a texture on said respective face, the texture configured to deflect, diffuse and redistribute light impinging on said front face uniformly such that light beams exiting said back face are oriented along an optical axis.

11. The light processing unit of claim 10, wherein
said color wheel contains at least three distinct radially equidistant zones, each zone being assigned to a narrowband light source, and
a rotation speed of drive for said color wheel is synchronized with switching means for sequentially switching on/off the light sources only when the respective light source beam area impinges on the associated zone on said color wheel.

12. The light processing unit of claim 10, wherein
the front face zones of said color wheel are structured with sets of refractive elements, each set being assigned to one zone, the deflection angle of each set of said refractive elements being selected to counter the incident angle of the beam of the corresponding light source such that the light incident on and emanating from the back face of the color wheel is parallel to the optical axis, and the back face of the color wheel is provided with a hologram that redistributes the impinging light within a homogeneous pyramidal exit beam.

13. The light processing unit of claim 12, wherein the front face zones of the color wheel are provided with a hologram that distributes the beam of the corresponding light source within a pyramidal beam of defined angles with respect to the incident beam direction, and the back face of the color wheel is structured with sets of refractive elements, each set being assigned to one zone, the deflection angle of each set of said refractive elements being selected to counter the incident angle of the beam of the corresponding light source.

14. The light processing unit of claim 11, wherein one of said front and back faces of said color wheel is patterned with a hologram that combines the function of redirecting the beam of the front face incident light such that the light emanating from the back face is parallel to the optical axis with the function of shaping said light exiting light beam to be distributed within a homogeneous pyramidal beam.

15. The light processing unit of claim 11, wherein said front face zones or said back face zones are textured with sets of refractive elements, each set being assigned to one zone, the deflection angle of each set of said refractive elements being selected to deflect the incoming light toward the optical axis, and said back face zones or said front face zones, respectively, are patterned with a hologram that combines the function of redirecting the beam emanating said refractive micro-prism to bring it in line with the optical axis with the function of shaping said light beam to be distributed within a homogeneous pyramidal beam.

16. The light processing unit of claim 13, wherein said hologram is a computer-generated hologram.

17. The light processing unit of claim 12, wherein said refractive elements are sets of micro-prisms.

18. The light processing unit of claim 12, wherein the dimensional structure of said refractive elements are smaller than the wavelength of the light impinging on said color wheel.

19. A light processing unit comprising:

a light entrance section to receive primary illumination light, a light processing section to process said received primary light and to output secondary illumination light, a light output section to provide said secondary light, wherein said light processing section comprises a color wheel which is adapted to receive, redistribute or redirect said primary illumination light to thereby generate said processed illumination light as said secondary illumination light which is redistributed or redirected compared to said primary illumination light, the color wheel comprising at least one face including textured portions.

20. The light processing unit of claim 19, wherein said color wheel comprises a front face for receiving said primary illumination light, and said color wheel comprises a back face for emitting said secondary illumination light.

21. The light processing unit of claim 19, wherein said color wheel includes means for reshaping, redistributing or redirecting said primary illumination light formed as at least one zone of said color wheel element.

22. The light processing unit of claim 21, wherein said zone of said color wheel is formed as a sector, a segment or a segmented ring of said color wheel.

23. The light processing unit of claim 22, wherein said zone of said color wheel comprises means for receiving as said primary illumination light in a defined spectral range and a defined light entrance direction.

24. The light processing unit of claim 21, wherein said zone of said color wheel comprises means for emitting as said secondary illumination light a defined spectral range to a defined light output direction.

25. The light processing unit of claim 21, wherein in the case of a plurality of zones of said color wheel said respective light output directions are identical and coincide to a common optical axis.

26. The light processing unit of claim 25, wherein said color wheel is rotatable about a rotational axis and wherein said common optical axis of said plurality of zones of said color wheel element is defined by an inclination angle with respect to said rotational axis of said color wheel.

27. The light processing unit of claim 26, wherein said common optical axis of said plurality of zones of said color wheel are parallel with respect to said rotation axis of said color wheel.

28. The light processing unit of claim 25, wherein said zones of said color wheel comprise deflection means in or on said front face of said color wheel.

29. The light processing unit of claim 28, wherein said zones of said color wheel comprise deflecting means in or on said back face of said color wheel.

30. The light processing unit of claim 29, wherein said deflecting means deflect and redirect said primary illumination light from said light entrance direction completely to said light output direction.

31. The light processing unit of claim 25, wherein said zones comprise first deflecting means in or on said front face of said color wheel, said zones comprise second deflecting means in or on said back face of said color wheel, said first deflecting means deflects and redirects said primary illumination light from said light entrance direction into defined intermediate light propagation direction, and said second deflecting means redirects said intermediate redirected illumination light from said intermediate light propagation direction completely into said desired light output direction.

32. The light processing unit according to claim 28, wherein said deflecting means are provided on one out of the group consisting of diffracting means, refracting means, grating structures and micro-prisms arrangements.

33. The light processing unit of claim 25, wherein said zones of said color wheel comprise first reshaping and redistributing means in or on said front face of said color wheel, said zones of said color wheel element comprise second reshaping and redistributing means in or on said back face of said color wheel, said first reshaping and redistributing means reshapes and redistributes said primary illumination light from a given entrance distribution into a defined intermediate distribution, and said second reshaping and redistributing means reshapes and redistributes said intermediate reshaping and redistributing primary illumination light from said intermediate distribution into a desired output distribution.

34. The light processing unit of claim 27, wherein said reshaping and redistributing means are provided as one of the group consisting of diffracting means, grating structures and hologram structures.

35. The light processing unit of claim 34, wherein said zones are adapted in order to reduce parasitic optical noise or speckles by optical diffusion properties as part of said reshaping and redistributing means.

36. An illumination unit comprising
a light source unit for generating and providing a primary light,
a light processing or optical unit according to one of claims 1 and 10 for receiving said primary light and for generating and providing processed primary light as secondary light, which secondary light is redistributed and redirected compared to said primary light.

37. The illumination unit according to claim 36, wherein
a plurality of light sources is provided in said light source unit, and
each of said light sources is assigned to one zone of said color wheel.

38. The illumination unit according to claim 37, wherein said light sources are operable in geometrical synchronization with respectively assigned zones of the rotated color wheel in order to illuminate by an associated light source the respectively assigned zone at a respectively assigned time slot only.

39. The illumination unit according to claim 38, wherein said light sources are coherent light sources.

40. The illumination unit according to claim 39, wherein said coherent light sources are laser light sources.

41. The illumination unit according to claim 38, further comprising condenser optics including means for receiving said secondary light from said light processing optical unit and for generating and providing condensed secondary light as tertiary illumination light.

42. An image generation unit comprising
an illumination unit according to claim 36, and
an image modulator unit to receive said tertiary light and to provide output light which is representative for an image.

43. A light processing method, comprising:
providing light to a transparent color wheel having a front face and a back face, at least one of said faces being provided with a texture on said respective face designed to deflect, diffuse and redistribute light impinging on said front face uniformly such that light beams exiting said back face are oriented along an optical axis; and
rotating the color wheel around an axis.

44. The light processing method according to claim 43, wherein light is impinged on said front face and thereby deflected, diffused and redistributed.

45. The light processing method according to claim 43, wherein at least three narrow-band light sources are assigned to respective distinct radially equidistant zones contained in said color wheel and provide the light to the transparent color wheel.

46. The light processing method according to claim 45, further comprising:
synchronizing a rotation speed for said color wheel with switching means for sequentially switching on one of the light sources only when a respective light source beam area impinges on the associated zone on said color wheel.

47. The light processing method according to claim 43, wherein
an incident angle of a beam of a light source is countered by having accordingly selected a deflection angle of a respective set of refractive elements of a respective assigned front face zone, and
the light incident on the back face of the color wheel is thereby directed parallel to the optical axis.

48. The light processing method according to claim 47, wherein the impinging light is redistributed within a homogeneous pyramidal exit beam by employing a hologram at the back face of the color wheel.

49. The light processing method according to claim 43, wherein the beam of a corresponding light source is distributed within a pyramidal beam of defined angles with respect to the incident beam direction with a hologram at the front face zones of the color wheel.

50. The light processing method according to claim 49, wherein the incident angle of the beam of the corresponding light source is countered having accordingly selected the deflection angle of a respective set of said refractive elements at the back face of the color wheel, each set being assigned to one zone.

51. The light processing method according to claim 43, wherein a beam of the front face incident light redirected and redistributed with a hologram patterned on one of said front and back faces of said color wheel that combines a function of redirecting the beam of the front face incident light such that the light emanating from the back face is parallel to the optical axis with a function of shaping said exiting light beam to be distributed within a homogeneous pyramidal beam.

52. The light processing method according to claim 43, wherein incoming light is deflected the toward the optical axis with sets of refractive elements structured on said front face zones or said back face zones, each set being assigned to one zone, the deflection angle of each set of said refractive elements being accordingly selected.

53. The light processing method according to claim 46, wherein the beam emanating said refractive micro-prism is redirected in line with the optical axis and distributed within a homogeneous pyramidal beam with a hologram patterned on said back face zones or said front face zones, respectively, that combines the function of redirecting to bring it with the function of shaping said light beam.

54. The optical unit of claim 1, wherein the at least one face having a textured portion is a light incident or light exiting face of the color wheel.

* * * * *